(12) United States Patent
Cho et al.

(10) Patent No.: US 11,880,793 B2
(45) Date of Patent: Jan. 23, 2024

(54) METHOD AND APPARATUS FOR CREATING WORKFLOW BASED ON LOG

(71) Applicant: SAMSUNG SDS CO., LTD., Seoul (KR)

(72) Inventors: Jun Hee Cho, Seoul (KR); Yun Jin Bae, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 126 days.

(21) Appl. No.: 17/126,233

(22) Filed: Dec. 18, 2020

(65) Prior Publication Data

US 2022/0114512 A1 Apr. 14, 2022

(30) Foreign Application Priority Data

Oct. 14, 2020 (KR) .................. 10-2020-0132768

(51) Int. Cl.
*G06Q 10/0633* (2023.01)
*G06F 11/34* (2006.01)

(52) U.S. Cl.
CPC ..... *G06Q 10/0633* (2013.01); *G06F 11/3438* (2013.01); *G06F 11/3476* (2013.01)

(58) Field of Classification Search
CPC ................................. G06Q 10/0633
See application file for complete search history.

(56) References Cited

U.S. PATENT DOCUMENTS

| | | | | |
|---|---|---|---|---|
| 11,363,047 B2 * | 6/2022 | Chauhan | ............. | H04L 63/1425 |
| 2007/0299795 A1 * | 12/2007 | Macbeth | ................ | G06Q 10/10 |
| | | | | 706/16 |
| 2019/0098037 A1 * | 3/2019 | Shenoy, Jr. | ......... | H04L 63/1441 |
| 2020/0272324 A1 * | 8/2020 | Chanda | ................ | G06Q 10/103 |
| 2021/0042638 A1 * | 2/2021 | Novotny | ............... | H04L 67/535 |
| 2021/0110345 A1 * | 4/2021 | Iyer | .................... | G06Q 10/0633 |
| 2021/0165639 A1 * | 6/2021 | Iyer | ........................ | G06N 20/00 |
| 2021/0185173 A1 * | 6/2021 | Kadakia | ............. | H04M 3/5231 |
| 2022/0044168 A1 * | 2/2022 | Oberman | ........... | G06Q 10/0633 |

FOREIGN PATENT DOCUMENTS

KR 10-2160344 B1 9/2020

OTHER PUBLICATIONS

Sahu et al, Invoice Processing Using Robotic Process Automation, International Journal of Scientific Research in Computer Science, Engineering and Information Technology, Mar.-Apr. 2020; 6 (2) : 216-223 (Year: 2020).*

Fung, Criteria, Use Cases and Effects of Information Technology Process Automation (ITPA), Advances in Robotics & Automation, vol. 3 • Issue 3 (Year: 2014).*

* cited by examiner

*Primary Examiner* — Andre D Boyce

(74) *Attorney, Agent, or Firm* — Sughrue Mion, PLLC

(57) ABSTRACT

A method and an apparatus for creating a workflow, the method being performed by a computing device, and including obtaining a log file generated while a user performs a task, parsing each of a plurality of events recorded in the log file, and creating an activity sequence to correspond to an order of the events, grouping a plurality of partial sequences extracted from the activity sequence, and creating a plurality of activity groups to correspond to each of a plurality of different repetitive tasks included in the task and creating the workflow of at least one activity group among the plurality of activity groups.

19 Claims, 16 Drawing Sheets

```
<Step type="Win" name="Click" apptitle=" task bar ">
  <Properties>
    <Property type="Win" key="Application_ProcessName" value="explorer" />         ─11
    <Property type="Win" key="Application_ClassName" value="Shell_TrayWnd" />
    <Property type="Win" key="Application_ClassType" value="Pane" />               ─12
    <Property type="Win" key="Target_TimeStamp" value="05/19/2020 09:20:15" />
    <Property type="Win" key="Target_ClassType" value="Button" />
    <Property type="Win" key="Target_Name" value="'Internet Explorer'" />
    <Property type="Win" key="Mouse_Point" value="35,32" />
                                                                                  ─13
```

FIG. 10

| activity key | activity | input | application | target | input value |
|---|---|---|---|---|---|
| a | input 'samsungsds.com' + Enter in an address bar of Chrome. | key input | Chrome | address bar | 'samsungsds.com' + Enter |
| b | right-click a recycle bin icon on a desktop. | mouse right-click | Window | recycle bin icon | - |
| c | click on an Internet Explorer shortcut on a taskbar. | mouse click | Window | IE shortcut in task bar | - |
| d | click a back button in the address bar at the top of Chrome. | mouse click | Chrome | back button in address bar | - |
| ... | ... | ... | ... | ... | ... |

| activity | storage (before update) | log | storage (after update) |
|---|---|---|---|
| a | 150 | 1 | 151 |
| b | 103 | 2 | 105 |
| c | 405 | 2 | 407 |
| d | 331 | 1 | 332 |
| e | 360 | 1 | 361 |
| ... | | ... | |

{a,b,c,b,c,d,e} — 31
| transition | storage (before update) | log | storage (after update) |
|---|---|---|---|
| a->b | 120 | 1 | 121 |
| b->c | 89 | 2 | 91 |
| c->d | 95 | 1 | 96 |
| d->e | 324 | 1 | 325 |
| c->b | 210 | 1 | 211 |
| ... | | ... | |
— 32
FIG. 13
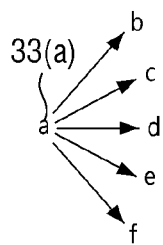
FIG. 14A
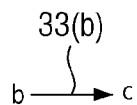
FIG. 14B 34(a) — [a,b,c,d,e]f,b,a,c,d,e,f,a,i,c,a,b,e,d,c,b,a,e,f,a,i n=1
K=5

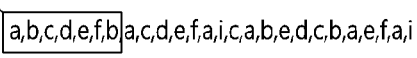
FIG. 16C
| | a | b | c | d | e | f | g | h | i |
|---|---|---|---|---|---|---|---|---|---|
| 36 {a,b,c,d,e} | 0 | 1 | 2 | 3 | 4 | 5 | 5 | 5 | 5 |
| 37 {f,a,b,d,e,g} | 1 | 2 | 6 | 3 | 4 | 0 | 5 | 6 | 6 |
| 38 {h,a,d,i,e} | 1 | 5 | 5 | 2 | 4 | 5 | 5 | 0 | 3 |
| sum | 2 | 8 | 13 | 8 | 12 | 10 | 15 | 11 | 14 |
FIG. 17
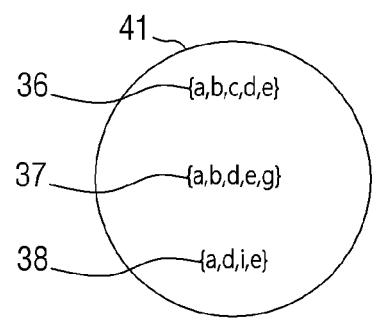
FIG. 18

|  | a | b | c | d | e | f | g | h | i |
|---|---|---|---|---|---|---|---|---|---|
| 36 — {a,b,c,d,e} | 4 | 3 | 2 | 1 | 0 | 5 | 5 | 5 | 5 |
| 37 — {f,a,b,d,e,g} | 4 | 3 | 6 | 2 | 1 | 5 | 0 | 6 | 6 |
| 38 — {h,a,d,i,e} | 3 | 5 | 5 | 2 | 0 | 5 | 5 | 4 | 1 |
| sum | 11 | 11 | 13 | 5 | 1 | 15 | 10 | 15 | 12 |
FIG. 19
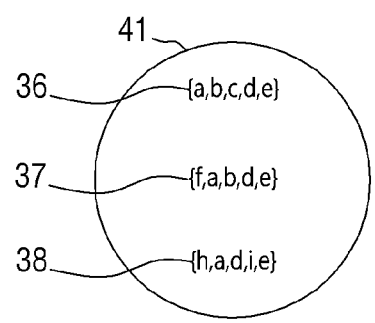
FIG. 20
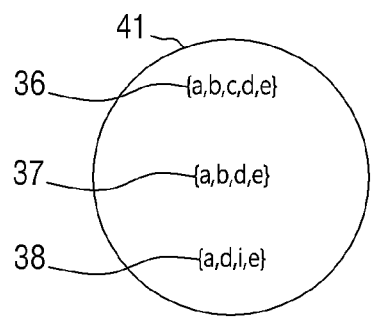
FIG. 21

61 — {a,b,c,d}

61(a) — a->d
61(b) — a->b->d
61(c) — a->c->d
61(d) — a -> b -> c->d

61 — {a,b,c,d}
62 — {a,c,f,d}

61(a) — a->d ○
61(b) — a->b->d ×
61(c) — a->c->d ○
61(d) — a -> b -> c->d ×

61 —— {a,b,c,d}
62 —— {a,c,f,d}
63 —— {a,e,c,f,d}

METHOD AND APPARATUS FOR CREATING WORKFLOW BASED ON LOG

This application claims the benefit of Korean Patent Application No. 10-2020-0132768, filed on Oct. 14, 2020, in the Korean Intellectual Property Office, the disclosure of which is incorporated herein by reference in its entirety.

BACKGROUND

1. Field

The present inventive concept relates to a method and apparatus for creating a workflow. More specifically, it relates to a method and apparatus for creating a workflow in which it analyzes log files generated while a user perform tasks, finds repetitive tasks that the user performs, and thus, the user may easily identify which task is the found repetitive task.

2. Description of the Related Art

Robotic process automation (RPA), a technology that automates tasks that users perform repeatedly, is one of the Information Technology (IT) technologies that have received the most attention over the past few years. The RPA-related market is steadily increasing, and the future market prospect is also classified as a bright technology.

In the RPA technology field, the RPA is applied to determine repetitive tasks to be automated, however automating the determined repetitive tasks through an actual bot is costly and time consuming. Therefore, there is a need for a process discovery (PD) technology that determines repetitive tasks to be automated by applying the RPA.

However, in the prior art related to the RPA, there is no technology for dynamically discovering repetitive tasks to be automated by applying the RPA.

SUMMARY

Aspects of the inventive concept provide a method and apparatus for dynamically discovering repetitive tasks to be automated by applying RPA.

Aspects of the inventive concept also provide a method and apparatus for visualizing repetitive tasks to be automated by applying RPA to a user in the form of a workflow.

Aspects of the inventive concept also provide a method and apparatus for discovering repetitive tasks to be automated by applying RPA using log files recorded by mixing multiple tasks performed by a user.

Aspects of the inventive concept also provide a method and apparatus for reducing the cost and time consumed in determining repetitive tasks to be automated by applying RPA.

Aspects of the inventive concept also provide a method and apparatus that do not require pre-selection of repetitive tasks to be automated by applying RPA.

Aspects of the inventive concept also provide a method and apparatus in which in order to log a predetermined repetitive task, it is not necessary to turn on a log collector before the start of the repetitive task and turn off the log collector after the end of the repetitive task.

However, aspects of the inventive concept are not restricted to those set forth herein. The above and other aspects of the inventive concept will become more apparent to one of ordinary skill in the art to which the inventive concept pertains by referencing the detailed description of the inventive concept given below.

According to an aspect of the present disclosure, there is provided a method for creating a workflow, the method being performed by a computing device, and comprising obtaining a log file generated while a user performs a task, parsing each of a plurality of events recorded in the log file, and creating an activity sequence to correspond to an order of the events, grouping a plurality of partial sequences extracted from the activity sequence, and creating a plurality of activity groups to correspond to each of a plurality of different repetitive tasks included in the task and creating the workflow of at least one activity group among the plurality of activity groups.

According to an embodiment, wherein obtaining the log file comprises obtaining in real time the log file generated while the user performs the task in real time.

According to an embodiment, wherein creating the activity sequence comprises parsing each of the plurality of events recorded in the log file, wherein the event is data on the user's activity included in the task, determining an activity key to correspond to each event using a result of the parsing and creating the activity sequence by connecting the determined activity keys according to the order of the events.

According to an embodiment, wherein determining the activity key to correspond to each event comprises when a target event among the plurality of events is not a pre-stored event, creating a target activity key of the target event not to be duplicated with a pre-stored activity key. Further comprising storing the created target activity key to correspond to the target event.

According to an embodiment, wherein creating the activity sequence comprises creating the activity sequence until there are no residual events in the log file.

According to an embodiment, wherein creating the plurality of activity groups comprises extracting the plurality of partial sequences from the activity sequence, grouping the extracted partial sequences into the plurality of activity groups according to similarity and filtering the plurality of activity groups.

According to an embodiment, wherein extracting the plurality of partial sequences comprises calculating the number of activities included in the activity sequence and the number of transitions of the activities and extracting the partial sequence using a degree of aggregation defined from the number of activities and the number of transitions of the activities.

According to an embodiment, wherein extracting the partial sequence using the degree of aggregation comprises calculating a first degree of aggregation of a first partial sequence corresponding to a minimum partial sequence length from an n-th activity of the activity sequence and if the calculated first degree of aggregation is less than a preset minimum degree of aggregation, calculating a second degree of aggregation of a second partial sequence corresponding to the minimum partial sequence length from an n+1-th activity of the activity sequence, determining whether the calculated second degree of aggregation is greater than or equal to the minimum degree of aggregation, and repeating movement of a start activity of the activity sequence until the calculated degree of aggregation is greater than or equal to the minimum degree of aggregation.

According to an embodiment, wherein repeating the movement of the start activity comprises when the number of remaining activities calculated from the start activity is less than the minimum partial sequence length, stopping the extraction of the partial sequence. Further comprising if the calculated first degree of aggregation is greater than or equal to the minimum degree of aggregation, extending the minimum partial sequence length and calculating a third degree of aggregation of a third partial sequence corresponding to the extended minimum partial sequence length from the n-th activity of the activity sequence, and determining whether the calculated third degree of aggregation is greater than or equal to the first degree of aggregation, when the third degree of aggregation is greater than or equal to the first degree of aggregation, repeatedly extending the minimum partial sequence length and repeating the extension of the minimum partial sequence length until the degree of aggregation of the partial sequence immediately before the extension exceeds the degree of aggregation of the partial sequence immediately after the extension and when the third degree of aggregation is less than the first degree of aggregation, extracting the first partial sequence.

According to an embodiment, wherein repeating the extension of the minimum partial sequence length comprises when the number of remaining activities calculated from the n-th activity is less than the extended minimum partial sequence length, stopping the extraction of the partial sequence. Further comprising repeating the extraction of the partial sequence with the next activity of the first partial sequence as the start activity.

According to an embodiment, wherein grouping the extracted plurality of partial sequences into the plurality of activity groups according to the similarity comprises by using the similarity defined from the number of common activities included in the first and second partial sequences extracted from the activity sequence and the number of transitions of the common activities, when the similarity is greater than or equal to a reference value, creating the activity group by merging the first partial sequence and the second partial sequence.

According to an embodiment, wherein filtering the plurality of activity groups comprises by using an activity removal cost, determining a start activity for each activity group and an end activity for each group.

According to an embodiment, wherein filtering the plurality of activity groups comprises when the number of partial sequences included in the activity group is less than a second reference number, removing the activity group.

According to an embodiment, wherein creating the workflow of at least one activity group among the plurality of activity groups comprises dividing an activity section of each of a plurality of target partial sequences belonging to a target activity group, creating a section workflow to correspond to each divided activity section and creating a target workflow by extending a plurality of created section workflows.

According to an embodiment, wherein creating the section workflow comprises determining a longest common node of a first division sequence and a second division sequence, which are created by dividing the activity section of each of the plurality of target partial sequences and indicate the same activity section and creating trunk lines between nodes by using the first division sequence and the second division sequence. Further comprising creating a new node by using a third partitioning sequence indicating the same activity section as the first partitioning sequence and the second partitioning sequence and creating trunk lines between nodes using the third division sequence.

According to another aspect of the present disclosure, there is provided an apparatus for creating a workflow, comprising a processor, a network interface, a memory and a computer program loaded into the memory and executed by the processor, wherein the computer program comprises instructions for obtaining a log file generated while a user performs a task, parsing each of a plurality of events recorded in the log file, and creating an activity sequence to correspond to an order of the events, grouping a plurality of partial sequences extracted from the activity sequence, and creating a plurality of activity groups to correspond to each of a plurality of different repetitive tasks included in the task and creating the workflow of at least one activity group among the plurality of activity groups.

BRIEF DESCRIPTION OF THE DRAWINGS

These and/or other aspects will become apparent and more readily appreciated from the following description of the embodiments, taken in conjunction with the accompanying drawings in which:

FIG. 10 is an exemplary diagram of a parsing log that may be referred to in some embodiments of the inventive concept;

FIG. 11 is an exemplary diagram of activity reference information that may be referred to in some embodiments of the inventive concept;

FIG. 12 illustrates updated activities of an activity sequence determined in step S420 of FIG. 6;

FIG. 13 illustrates updated transitions of an activity sequence determined in step S420 of FIG. 6;

FIGS. 14A and 14B are exemplary diagrams for explaining in more detail the degree of aggregation described with reference to step S430 of FIG. 6;

FIGS. 15A to 15C are exemplary diagrams for explaining in more detail the partial sequence extraction described with reference to steps S432 and S433 of FIG. 7;

FIGS. 16A to 16C are exemplary diagrams for explaining in more detail the partial sequence extraction described with reference to step S435 of FIG. 7;

FIG. 17 is an exemplary diagram of a plurality of partial sequences included in a specific activity group for explaining a start activity in step S450 of FIG. 6;

FIG. 18 is an exemplary diagram of an activity group and partial sequences constituting the activity group for explaining a start activity in step S450 of FIG. 6;

FIG. 19 is an exemplary diagram of a plurality of partial sequences included in a specific activity group for explaining determination of an end activity in step S450 of FIG. 6;

FIG. 20 is an exemplary diagram of an activity group and partial sequences constituting the activity group for explaining an end activity in step S450 of FIG. 6;

FIG. 21 is a diagram of refined partial sequences constituting an activity group refined by determination of a start activity for each group and an end activity for each group described with reference to FIGS. 17 to 20;

DETAILED DESCRIPTION

Figure 1:
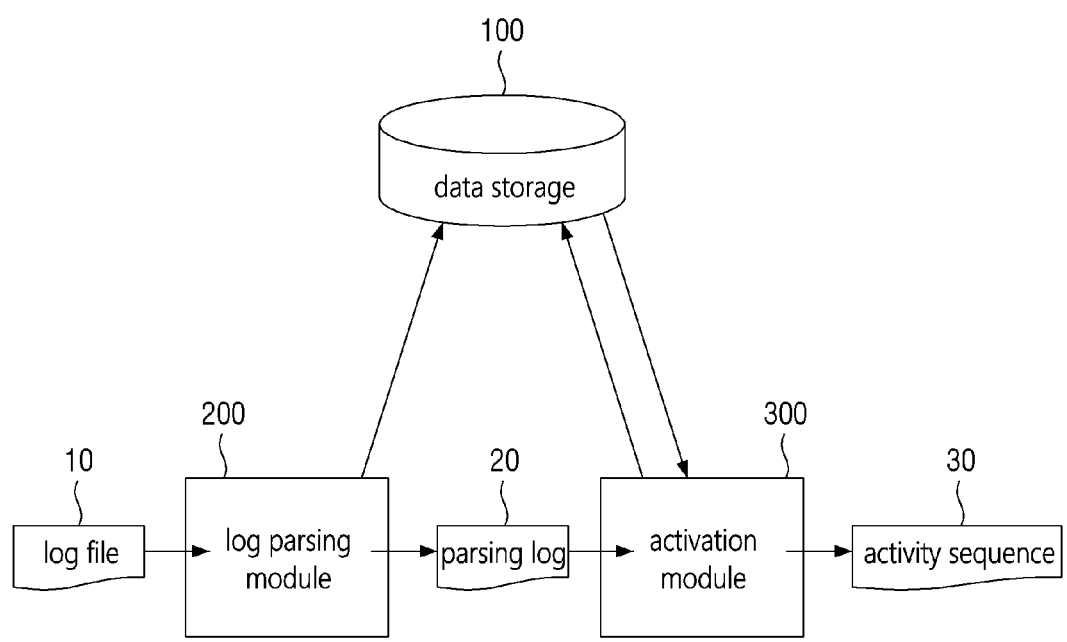
FIG. 1 illustrates a log parsing module and an activation module in a system for creating a workflow according to an embodiment of the inventive concept.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present invention, when it is determined that the detailed description of the related well-known configuration or function may obscure the gist of the present invention, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the present invention will be described in detail with reference to the accompanying drawings.

Figure 2:
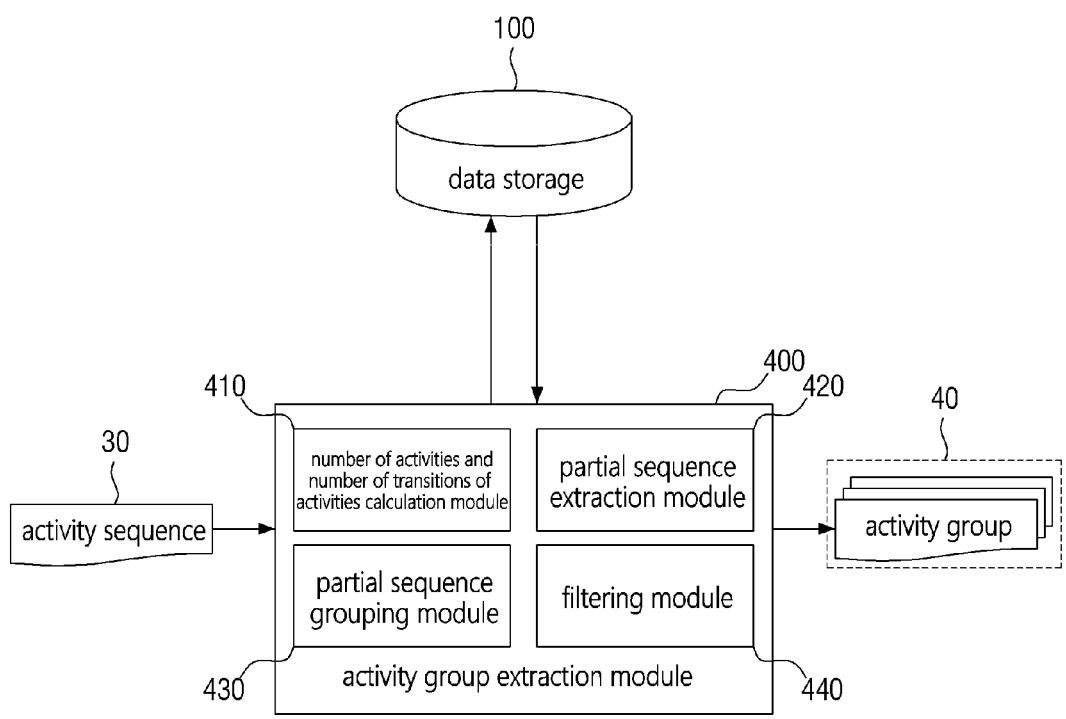
FIG. 2 illustrates an activity group extraction module in the system for creating a workflow according to an embodiment of the inventive concept.
Figure 3:
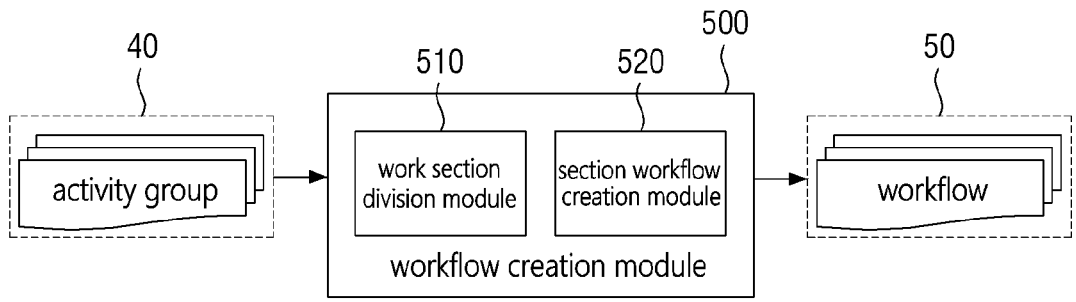
FIG. 3 illustrates a workflow module in the system for creating a workflow according to an embodiment of the inventive concept.

FIGS. 1 to 3 are diagrams for explaining a system for creating a workflow according to an embodiment of the inventive concept. Each of components of the system for creating the workflow disclosed in FIGS. 1 to 3 represents functional elements that are functionally divided, and any one or more components may be integrated and implemented in an actual physical environment.

Referring to FIGS. 1 to 3, the system for creating the workflow according to the embodiment of the inventive concept may include a data storage 100, a log parsing module 200, an activation module 300, an activity group extraction module 400, and a workflow creation module 500. Hereinafter, each component will be described in detail.

Referring to FIG. 1, the log parsing module 200 parses a plurality of events recorded in a log file 10, respectively, and creates a parsing log 20. Here, the log file 10 is generated while a user performs a task, and a plurality of events are recorded in the log file 10. Here, the event refers to data on a user's activity included in a task performed by the user. For example, when the user right-clicks a recycle bin icon on a desktop, the event refers to log data generated by right-clicking the recycle bin icon on the desktop. The events recorded in the log file 10 are standardized by the log parsing module 200 and recorded in the parsing log 20.

A specific method for creating the parsing log 20 by parsing the plurality of events recorded in the log file 10 by the log parsing module 200 will be detailed later through description herein.

The log parsing module 200 transmits the parsing log 20 to the data storage 100. Here, the data storage 100 stores the parsing log 20 received from the log parsing module 200. In addition, the log parsing module 200 transmits the parsing log 20 to the activation module 300.

Next, the activation module 300 creates an activity sequence 30 by using the parsing log 20 received from the log parsing module 200. Here, the activity sequence 30 refers to data on the arrangement of the user's activities included in the task performed by the user.

The activation module 300 creates the activity sequence 30 by sequentially mapping activity keys of activities corresponding to a plurality of standardized events recorded in the parsing log 20. A specific method for creating the activity sequence 30 by the activation module 300 will be embodied later through descriptions herein.

In addition, the activation module 300 refers to activity reference information stored in the data storage 100. In addition, the activation module 300 transmits new activity reference information to the data storage 100. Here, the data storage 100 receives the new activity reference information from the activation module 300 and updates the activity reference information. Here, the activity reference information means information related to the user's activity. A detailed description of the activity reference information will be detailed later through FIG. 11.

In addition, the activation module 300 transmits the created activity sequence 30 to the activity group extraction module 400.

Next, referring to FIG. 2, the activity group extraction module 400 creates a plurality of activity groups 40 by using the activity sequence 30 received from the activation module 300. Here, the activity group 40 is a set of partial sequences corresponding to each of a plurality of different repetitive tasks included in the tasks performed by the user. A plurality of partial sequences is extracted from the activity sequence 30 indicating data on the arrangement of the user's activities, and the partial sequences are merged according to similarity between the extracted plurality of partial sequences to form the activity group 40. The activity group 40 formed in this way corresponds to any one repetitive task included in the task performed by the user.

Hereinafter, the configuration of the activity group extraction module 400 will be described. The number of activities and the number of transitions of the activities calculation module 410 calculates the number of activities included in the activity sequence 30 and the number of transitions of the activities. The number of activities and the number of transitions of the activities calculation module 410 transmits the calculated number of activities and the number of transitions of the activities to the data storage 100. Here, the data storage 100 updates and stores the number of accumulated activities and the number of transitions of the accumulated activities.

Next, a partial sequence extraction module 420 extracts the plurality of partial sequences from the activity sequence 30 using the number of activities and the number of transitions of the activities calculated by the number of activities and the number of transitions of the activities calculation module 410.

Next, a partial sequence grouping module 430 groups the plurality of partial sequences extracted by the partial sequence extraction module 420 into the activity group 40 based on similarity.

Next, a filtering module 440 filters the activity group 40 grouped by the partial sequence grouping module 430.

A more detailed description of the activity group extraction module 400 described with reference to FIG. 2 will be embodied later through description herein.

Next, referring to FIG. 3, the workflow creation module 500 creates a workflow 50 of the plurality of activity groups 40 created from the activity group extraction module 400. Here, the workflow 50 refers to data capable of visualizing an activity arrangement structure of a specific repetitive task included in the task performed by the user. The workflow may be used for the purpose of comparing the activity arrangement structures between different repetitive tasks. In addition, it is provided to a robotic process automation (RPA) designer and may be used as a resource for writing RPA scripts. Furthermore, the RPA scripts may also be dynamically created by being transmitted to an RPA creation bot.

Hereinafter, the configuration of the workflow creation module 500 will be described.

A work section division module 510 divides an activity section of a plurality of partial sequences included in a specific activity group 40. Here, a reference by which the work section division module 510 divides the plurality of partial sequences is a common node of the plurality of partial sequences. The work section division module 510 divides the plurality of partial sequences according to the reference, i.e., the common node, thereby lowering a computing load generated in the creation of the workflow.

Next, a section workflow creation module 520 creates a section workflow for each divided section by using a plurality of division sequences that are divided and created by the work section division module 510. In addition, the workflow 50 is created by extending the created section workflow.

A more detailed description of the workflow creation module 500 described with reference to FIG. 3 will be embodied later through description herein. So far, the system for creating the workflow according to the embodiment of the inventive concept has been described with reference to FIGS. 1 to 3. According to the embodiment, the workflow 50 corresponding to the repetitive task included in the task performed by the user may be dynamically created based on the log file 10.

Figure 4:
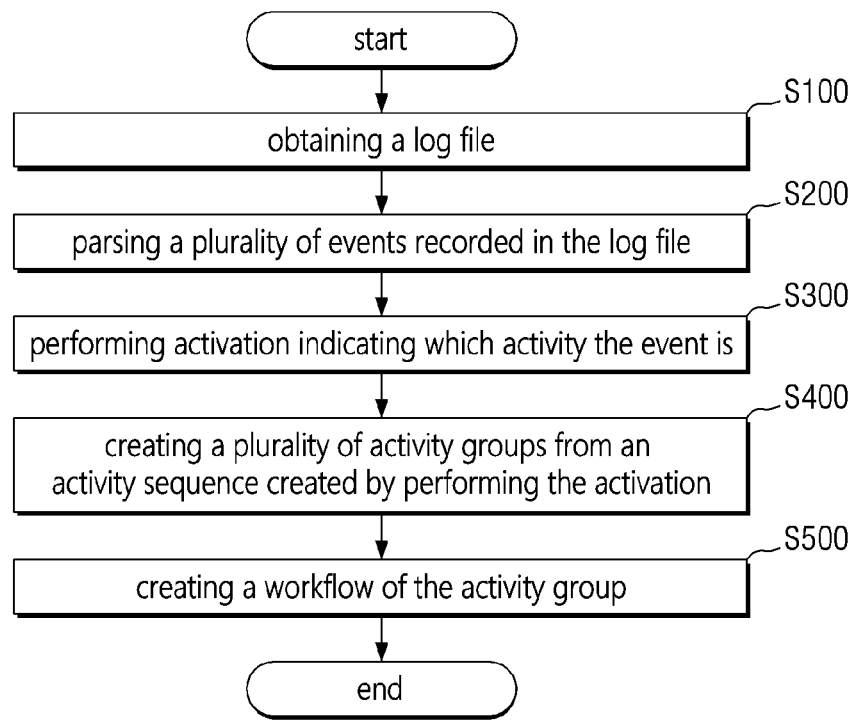
FIG. 4 is a flow chart illustrating a method for creating a workflow according to another embodiment of the inventive concept.

Hereinafter, referring to FIGS. 4 to 25B, a method for creating a workflow according to another embodiment of the inventive concept will be described in more detail. FIG. 4 is a flow chart illustrating the method for creating the workflow according to the another embodiment of the inventive concept. The method according to the embodiment may be performed by a computing device. In addition, the method according to the embodiment may be performed by being divided by a first computing device and a second computing device. Hereinafter, in performing each operation of the method according to the embodiment, if the description of a subject is omitted, it may be interpreted that the subject is the computing device.

Referring to FIG. 4, in step S100, a log file is obtained. In some embodiments, the log file generated while a user performs a task in real time may be obtained in real time. The user installs a log collector on a PC performing the task and the log collector runs in the background while the user performs real-time tasks. As a result, the log files may be obtained in real time. In some other embodiments, the log file may be obtained every preset period. In some other embodiments, the log file may be obtained by a trigger of the user.

In a method for creating a workflow according to an embodiment to be specified later, repetitive tasks are dynamically extracted from log files recorded by mixing multiple tasks. Therefore, there is no need to turn on a log collector before the start of a specific task and turn off the log collector after the end of the specific task too log specific pre-selected tasks. Accordingly, a user does not need to turn on and off the log collector separately by running the log collector in the background to perform tasks. Therefore, user convenience may be increased.

Next, in step S200, a plurality of events recorded in the log file are parsed. Here, the parsing refers to standardizing each of a plurality of log data corresponding to the plurality of events recorded in the log file into a meaningful data form.

For a specific example, when the user right-clicks a recycle bin icon on the desktop, log data generated by right-clicking the recycle bin icon on the desktop is recorded as the event in the log file, as described above. These log data are standardized according to the activity reference item. More specifically, the data mapped to the reference item 'input' is 'mouse right-click.' In addition, the data mapped to the reference item 'application' is 'Window.' In addition, the data mapped to the reference item 'target' is the 'recycle bin icon.' However, the inventive concept is not limited to this example. All methods of standardizing into meaningful data form using log data may be included in the inventive concept.

Next, in step S300, using the plurality of standardized events recorded in a parsing log, activation is performed indicating which activity the event is. Here, an activity sequence is created by performing the activation. Such an activity sequence is created to correspond to an order of the plurality of standardized events recorded in the parsing log. Hereinafter, a detailed description of step S300 will be described with reference to FIG. 5.

Figure 5:
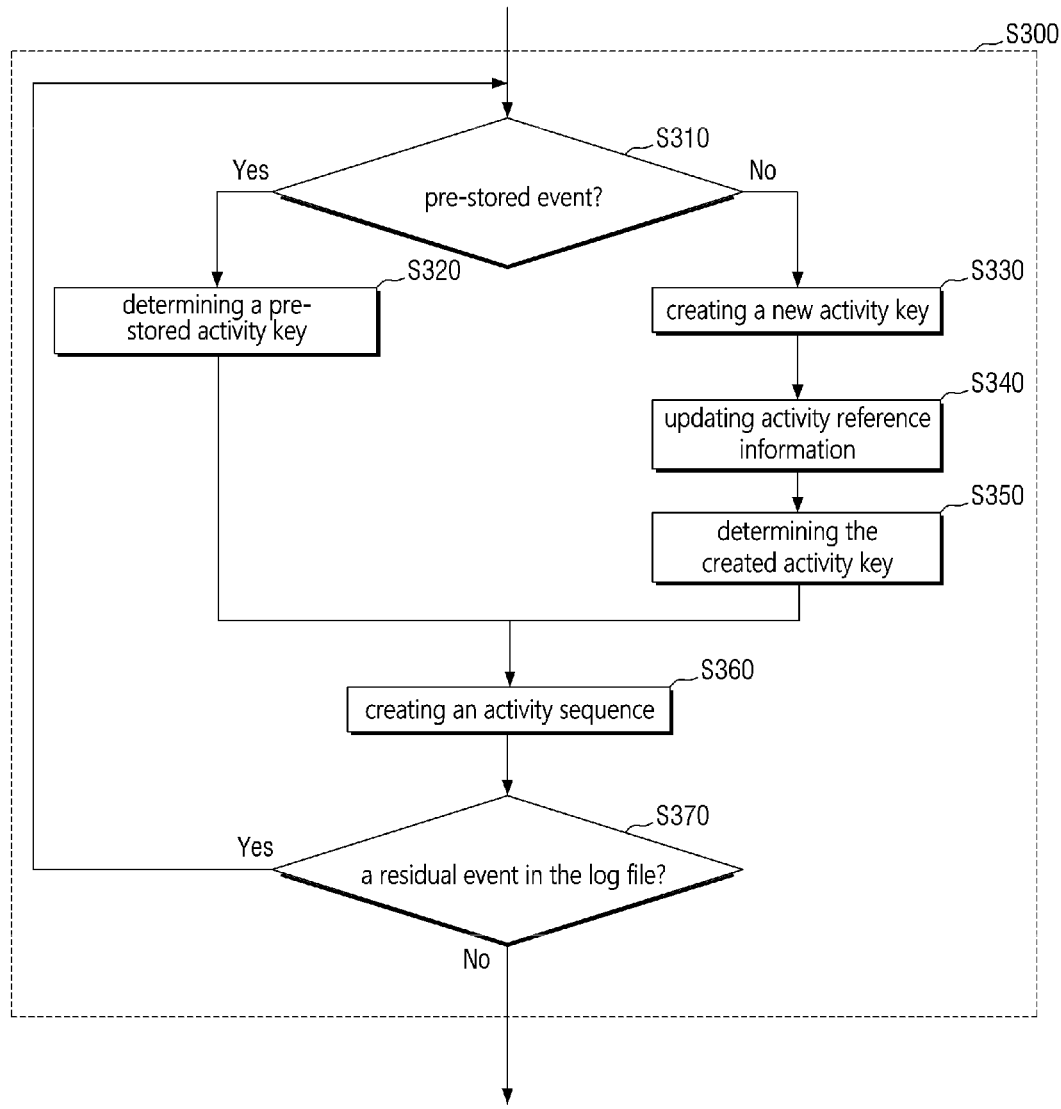
FIG. 5 is a flow chart for explaining in more detail operations within step S300 of the method for creating the workflow described with reference to FIG. 4.

FIG. 5 is a flow chart for explaining in more detail some operations of the method for creating the workflow described with reference to FIG. 4. Referring to FIG. 5, in step S310, it is determined whether the event is a pre-stored event. For a detailed description related to this, reference will be made to FIG. 10. FIG. 10 is an exemplary diagram of a parsing log that may be referred to in some embodiments of the inventive concept.

Referring to FIG. 10, the parsing log that parses the log data generated by performing the activity called clicking an Internet Explorer shortcut on a taskbar is shown. More specifically, the data mapped to the reference item 'Application_ProcessName' is 'explorer.' In addition, the data mapped to the reference item 'Target_TimeStamp' is '05/19/2020 09:20:15.' In addition, the data mapped to the reference item 'Mouse_point' is '35, 32.'

Here, the reference item is divided into a reference item that may identify an activity and a reference item that cannot identify an activity. In the example described with reference to FIG. 10, the 'Application_ProcessName' reference item will be mapped to 'explorer' in the same way whenever one performs the same activity that clicks on the Internet Explorer shortcut on the taskbar. Therefore, it is an identifiable reference item 11 that may identify an activity. On the other hand, the reference item 'Target_TimeStamp' or 'Mouse_point' may be mapped differently even if the same activity of clicking the Internet Explorer shortcut in the taskbar is performed. Therefore, it is a non-identifiable reference item 12 and 13 that cannot identify the activity. Using the identifiable reference item 11, it is determined whether the event described with reference to FIG. 5 is the pre-stored event. Here, even in the case of the non-identifiable reference items 12 and 13, they are parsed as meaningful data. This is because the data mapped to the non-identification reference items 12 and 13 are also required when visualizing a workflow or creating an RPA script. It will be described again with reference to FIG. 5.

Referring to FIG. 5, in a determination result of step S310, if the event is the pre-stored event, in step S320, the activity key pre-stored in the activity reference information is determined as the activity key of the event. In the determination result of step S310, if the event is not the pre-stored event, a new activity key is created in step S330, the activity reference information is updated in step S340, and in step S350, the newly created activity key is determined as the activity key of the event. Here, the newly created activity key is created so as not to duplicate the pre-stored activity key. For a detailed description related to this, reference will be made to FIG. 11. FIG. 11 is an exemplary diagram of activity reference information that may be referred to in some embodiments of the inventive concept.

Referring to FIG. 11, activity reference information stored in a data storage is shown. A first activity 14 is an activity of entering samsungsds.com and an Enter key in a Chrome address bar. A second activity 15 is an activity that right-clicks a recycle bin icon on a desktop. A third activity 16 is an activity of clicking an Internet Explorer shortcut on a task bar. A fourth activity 17 is an activity of clicking a back button in an address bar at the top of Chrome. The activity reference information is classified and stored as a reference item. Reference items illustrated in FIG. 11 include 'activity key,' 'activity,' 'input,' 'application,' 'target,' and 'input value.'

When explaining step S320 for a specific example, if the event is the second activity 15 pre-stored, the activity key of the event is determined as b. For another example, referring to step S320, when the event is the fourth activity 14 pre-stored, the activity key of the event is determined as d.

In addition, when explaining steps S330 to S350 for a specific example, if the event is not the pre-stored event, in step S330, a new activity key may be created as e so as not to overlap with the activity keys of the first activity 14 to the fourth activity 17. In addition, in step S340, by mapping and storing information corresponding to the event according to the reference item, the activity reference information may be updated. In addition, in step S350, the newly created activity key e may be determined as the activity key of the event. It will be described again with reference to FIG. 5.

Referring to FIG. 5, in step S360, the activity sequence is created by connecting the activity key determined according to an event order. Next, if there is a residual event in the log file in step S370, the process returns to step S310 and an activity key corresponding to the next event is determined. In addition, in step S370, if there is no residual event in the log file, creation of the activity sequence is stopped. It will be described again with reference to FIG. 4.

Referring to FIG. 4, in step S400, by grouping the plurality of partial sequences extracted from the activity sequence created by performing the activation, a plurality of activity groups are created to correspond to each of a plurality of different repetitive tasks included in a user's task. For a detailed description related to step S400, reference will be made to FIG. 6.

Figure 6:
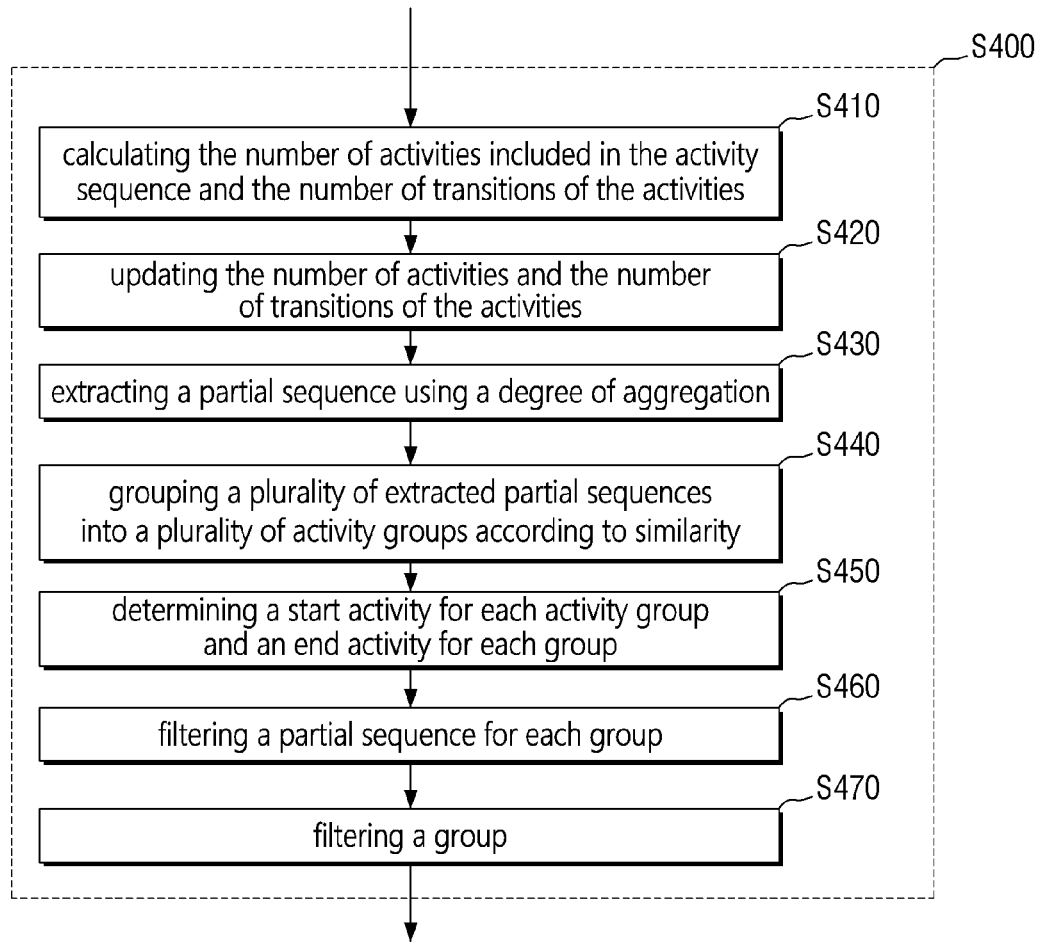
FIG. 6 is a flow chart for explaining in more detail operations within step S400 of the method for creating the workflow described with reference to FIG. 4.

FIG. 6 is a flow chart for explaining in more detail some operations of the method for creating the workflow described with reference to FIG. 4. Referring to FIG. 6, in step S410, the number of activities included in the activity sequence and the number of transitions of the activities are calculated. Next, in step S420, the number of activities and the number of transitions of the activities are updated. For a detailed description related to this, it will be described with reference to FIGS. 12 to 13.

Referring to FIG. 12, a target activity sequence 31 is {a,b,c,b,c,d,e}. Here, the number of activities included in the target activity sequence 31 is 1 for {a}, 2 for {b}, 2 for {c}, 1 for {d}, and 1 for {e}.

Referring to FIG. 13, the number of transitions of the activities included in the target activity sequence 31 is 1 time for {a→b}, 2 times for {b→c}, 1 time for {c→d}, 1 times for {d→e}, and 1 time for {c→b} according to the order in which the activities are listed.

As such, in FIGS. 12 and 13, the number of activities and the number of transitions of the activities are calculated by the target activity sequence 31, and new data 32 is added to the previous data stored in the data storage, and the data is updated. As in this example, data on the number of activities and the number of transitions of the activities are updated in the data storage, so that the extraction performance of repetitive tasks may be improved using the accumulated data. FIG. 6 will be referenced again.

Referring to FIG. 6, in step S430, a partial sequence is extracted using the degree of aggregation defined from the number of activities and the number of transitions of the activities. In order to explain the concept of the degree of aggregation, related drawings will be described with reference to FIGS. 14A and 14B.

Referring to FIG. 14A, activity a 33(a) may be transferred to b, c, d, e, and f. On the other hand, referring to FIG. 14B, an activity b may only be transferred to c. As such, it is reasonable that activities that may be transited to various activities, such as activity a 33(a), are treated as noise and are determined to be inappropriate activities to extract repetitive tasks. On the other hand, the transition 33(b) from the activity b to c is that activity c is immediately performed when activity b is performed, and it is reasonable that it is determined as an appropriate activity to extract repetitive tasks.

In order to calculate the degree of aggregation of this concept numerically, Equation 1 below may be applied. Equation 1 below is an equation for calculating the degree of aggregation when the activity sequence is {a,b}.

$$p_{a,b} = \frac{n_{a \to b}}{n_a + w}$$

where $p_{a,b}$ means the degree of aggregation of the sequence transitioning from activity a to b, $n_a$ means the number of activities a, $n_{a \to b}$ means the number of transitions from activity a to b and w is a constant for preventing the degree of aggregation from being excessively high when data is small. As for the degree of aggregation, the case as shown in FIG. 14B in which the number of conversions to only a specific activity is high compared to the number of activities existing in the activity sequence is calculated.

A formula for calculating the degree of aggregation when the activity sequence is {a,b,c,b,c} is shown in Equation 2 below.

$$p_{a,b,c,b,c} = \frac{p_{a,b} + 2p_{b,c} + p_{c,b}}{4}$$

Through Equations 1 and 2, the degree of aggregation of the activity sequence in which the plurality of activities are arranged in order may be calculated. Hereinafter, a specific method for extracting a partial sequence will be described with reference to FIG. 7.

Figure 7:
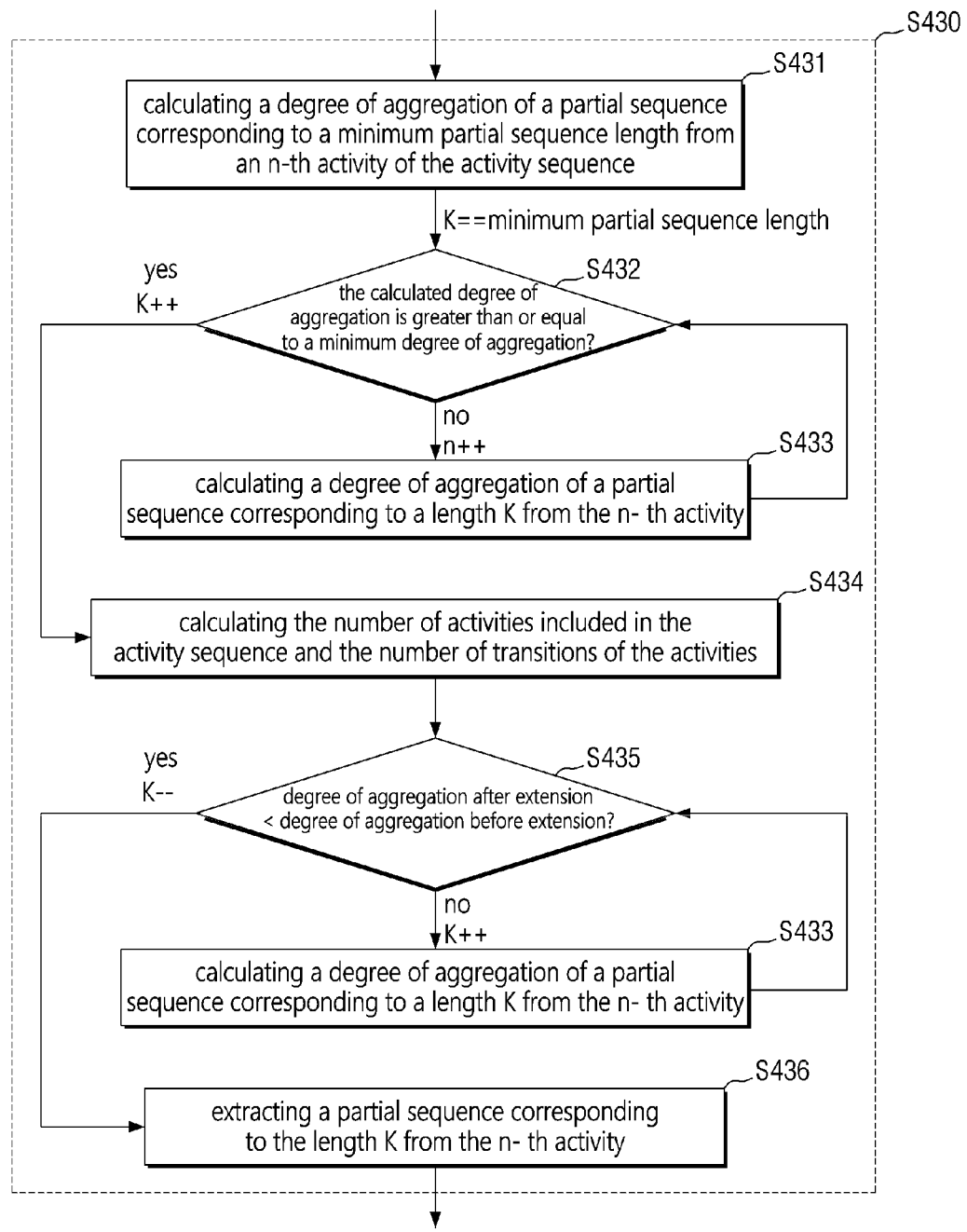
FIG. 7 is a flow chart for explaining in more detail some operations of the method for creating the workflow described with reference to FIG. 6.

Referring to FIG. 7, in step S431, a first degree of aggregation of a first partial sequence corresponding to a minimum partial sequence length is calculated from an n-th activity of the activity sequence. Here, the minimum partial sequence length means the minimum number of activities that the partial sequence to be extracted must have. The minimum partial sequence length is a preset value.

Next, if the first degree of aggregation calculated in step S432 is less than a preset minimum degree of aggregation, in step S433, a second degree of aggregation of a second partial sequence corresponding to the minimum partial sequence length is calculated from an n+1-th activity of the activity sequence, and it is determined in step S432 whether the calculated second degree of aggregation is greater than or equal to the minimum degree of aggregation. Here, the movement of a start activity (n++) of the activity sequence is repeated until the calculated degree of aggregation is greater than or equal to the minimum degree of aggregation. In this regard, it will be described with reference to FIGS. 15A to 15C.

Referring to FIG. 15A, the start activity is a first activity, and the minimum partial sequence length is 5. Here, a first degree of aggregation of a first partial sequence 34(a) is calculated. When the calculated first degree of aggregation is less than the preset minimum degree of aggregation, the start activity is moved to a second activity as shown in FIG. 15B. Here, a second degree of aggregation of a second partial sequence 34(b) is calculated. If the calculated second degree of aggregation is still less than the preset minimum degree of aggregation, the start activity is moved to a third activity as shown in FIG. 15C. Here, a third degree of aggregation of a third partial sequence 34(c) is calculated. In this way, the movement of the start activity of the activity sequence is repeated until the calculated degree of aggregation exceeds the minimum degree of aggregation.

However, in some embodiments, when the number of remaining activities calculated from the moved start activity is less than the minimum partial sequence length, extraction of the partial sequence may be stopped. When described with reference to FIGS. 15A to 15C for a specific example, when the start activity is a 23rd activity e, and the minimum partial sequence length is 5, the extraction of the partial sequence is stopped. As in the embodiment, when the partial sequence satisfying the minimum partial sequence length may no longer be extracted, the extraction of the partial sequence is stopped. It will be described again with reference to FIG. 7.

Referring to FIG. 7, if the first degree of aggregation calculated as a result of the determination in step S432 is greater than or equal to the minimum degree of aggregation, it extends the minimum partial sequence length, and in step S434, a third degree of aggregation of a third partial sequence corresponding to the minimum partial sequence length extending from the nth activity of the activity sequence is calculated, and it is determined whether or not the third degree of aggregation calculated in step S435 is greater than or equal to the first degree of aggregation.

Here, when the third degree of aggregation is greater than or equal to the first degree of aggregation as a result of the determination in step S435, it iteratively extends the minimum partial sequence length, and the extension of the minimum partial sequence length (K++) is repeated until the degree of aggregation of the partial sequence immediately before the extension exceeds the degree of aggregation of the partial sequence immediately after the extension.

Here, as the result of the determination in step S435, if the third degree of aggregation is less than the first degree of aggregation, the first partial sequence is extracted. For a detailed description related to this, it will be described with reference to FIGS. 16A to 16C.

Referring to FIG. 16A, the start activity is a first activity, and the minimum partial sequence length is 5. Here, a fourth degree of aggregation of a fourth partial sequence 35(a) is calculated. The fourth degree of aggregation is greater than or equal to the preset minimum degree of aggregation. Therefore, as shown in FIG. 16B, the minimum partial sequence length is extended to 6. Referring to FIG. 16B, the start activity is a first activity, and the minimum partial sequence length is 6. Here, a fifth degree of aggregation of the fifth partial sequence 35(b) is calculated. If the calculated fifth degree of aggregation is greater than or equal to the fourth degree of aggregation, the minimum partial sequence length is extended to 7 as shown in FIG. 16C. Referring to FIG. 16C, the start activity is a first activity, and the minimum partial sequence length is 7. Here, a sixth degree of aggregation of a sixth partial sequence 35(c) is calculated. Since the calculated sixth degree of aggregation is less than the fifth degree of aggregation, the fifth partial sequence 35(b) is extracted as a partial sequence. In this way, the extension of the minimum partial sequence length is repeated until the calculated degree of aggregation immediately before exceeds the degree of aggregation immediately after.

However, in some embodiments, when the number of remaining activities calculated from the n-th activity is less than the extended minimum partial sequence length, the extraction of the partial sequence may be stopped. When described with reference to FIGS. 16A to 16C for a specific example, when the start activity is a first activity a, and the extended minimum partial sequence length is 27, the extraction of the partial sequence is stopped. As in the embodiment, when the partial sequence satisfying the minimum partial sequence length may no longer be extracted, the extraction of the partial sequence is stopped.

Further, in some embodiments, the extraction of the partial sequence may be repeated with the next activity of the extracted partial sequence as the start activity. When described with reference to FIGS. 16A to 16C for a specific example, steps described with reference to FIG. 7 are repeated with a seventh activity, which is the next activity after the fifth partial sequence 35(b) is extracted as a partial sequence, as a start activity. In this way, a plurality of partial sequences may be extracted from one activity sequence. It will be described again with reference to FIG. 6.

Referring to FIG. 6, in step S440, a plurality of extracted partial sequences are grouped into a plurality of activity groups according to similarity.

Here, the similarity is data representing the degree of similarity between partial sequences. The similarity, i.e., the similarity between partial sequences is calculated by using at least one of a reciprocal of an edit distance, a length of a common sequence, the number of transitions of the common activities, and the number of common activities, and is data normalized to a value between 0 and 1. Here, the reciprocal of the edit distance means the number of edits required to make sequences identical to each other. Therefore, as the number of edits decreases, the edit distance becomes shorter, the reciprocal of the edit distance increases, and the similarity increases. In addition, the common sequence length means a length of a common sequence included between partial sequences. Therefore, the longer the length of the common sequence, the greater the similarity. Also, the number of transitions of the common activities means the number of transitions of activities which are common. Therefore, the greater the number of transitions of the common activities, the greater the similarity. In addition, the number of common activities means the number of activities which are common. Therefore, the greater the number of common activities, the greater the similarity.

A method for grouping a plurality of partial sequences into a plurality of groups proceeds according to the following steps. In a first step, each of all extracted partial sequences is determined as one group. In a second step, similarity between all groups is calculated. In a third step, group pairs that are greater than or equal to a reference value are merged. In a fourth step, the similarity between the groups is updated according to the merging. In order to describe the update of the similarity in the fourth step, it will be described with reference to Equation 3 below.

$$S_{g1,g2\sim gi} = \frac{n_{g1} * S_{g1\sim gi} + n_{g2} * S_{g2\sim gi}}{n_{g1} + n_{g2}}$$

$S_{g1,g2\sim gi}$ means similarity between the merged group of groups 1 and 2 and group i. $n_{g1}$ means the number of activities of a constituent partial sequence of group 1, and $n_{g2}$ means the number of activities of a constituent partial sequence of group 2. $S_{g1\sim gi}$ means similarity between group 1 and group i, and $S_{g2\sim gi}$ mean similarity between group 2 and group i. In this way, the similarity between the merged group and another group is calculated by a weighted average of the similarity between two groups before the groups are merged and the other group.

In some embodiments, when an activity group less than or equal to a first reference number is created, merging of partial sequences may be stopped. By setting the first reference number in advance, a lower limit of the number of activity groups to be created may be set.

Next, in step S450, a start activity for each activity group and an end activity for each group may be determined using an activity removal cost. Determining the start activity for each group and the end activity for each group is to determine the start and end activities of all partial sequences in the group to be the same. For a detailed description related to this, it will be described with reference to FIGS. 17 to 21.

FIGS. 17 and 18 are diagrams for explaining determination of a start activity for each group. Referring to FIG. 17, a plurality of partial sequences included in a specific activity group are shown. When a specific activity among a first partial sequence 36 within the group, a second partial sequence 37 in the group, and a third partial sequence 38 within the group is determined as a start activity, the number of activities to be removed is shown in a table. For example, if a is determined as the start activity, since {a,b,c,d,e} is maintained in the first partial sequence 36 in the group, a removal cost is zero. Further, since the second partial sequence 37 in the group is refined to {a,b,d,e,g}, a removal cost for removing {f} is 1. Further, since the third partial sequence 38 in the group is refined to {a,d,i,e}, a removal cost of removing {h} is 1. Thus, if a is determined as the start activity, the sum of the total removal costs is 2. As such, the activity with the lowest removal cost may be determined as the start activity.

Referring to FIG. 18, an activity group 41 is shown, and partial sequences constituting the activity group 41 are shown. The first partial sequence 36 to the third partial sequence 38 within the group has been refined with the start activity determined as {a}.

FIGS. 19 and 20 are diagrams for explaining determination of an end activity for each group. As described with reference to FIGS. 17 and 18, the activity with the lowest removal cost may be determined as the end activity in determining the end activity for each group. Referring to FIG. 20, an activity group 41 is shown, and partial sequences constituting the activity group 41 are shown. The first partial sequence 36 to the third partial sequence 38 within the group has been refined as the end activity is determined to be {e} with the lowest removal cost.

FIG. 21 is a diagram for illustrating a partial sequence refined by determination of a start activity for each group and an end activity for each group described with reference to FIGS. 17 to 20. Referring to FIG. 21, refined partial sequences constituting the activity group 41 are shown. The first partial sequence 36 within the group is {a,b,c,d,e}, the second partial sequence 37 within the group is {a,b,d,e}, and the third partial sequence 38 within the group is {a,d,i,e}. In this way, a start activity and an end activity of a plurality of partial sequences constituting one activity group 41 are unified. It will be described again with reference to FIG. 6.

Referring to FIG. 6, in step S460, a partial sequence for each group is filtered. When the number of activities in an individual partial sequence refined by determining the start and end activities for each group is less than or equal to a preset minimum sequence length, individual partial sequences in which the number of activities is less than or equal to a reference number may be removed.

Next, in step S470, an activity group is filtered. When the number of partial sequences in the activity group is less than a second reference number, the corresponding activity group may be removed. It will be described again with reference to FIG. 4.

Referring to FIG. 4, in step S500, a workflow of at least one activity group among a plurality of activity groups is created. For a detailed description related to this, it will be described with reference to FIG. 8.

Figure 8:
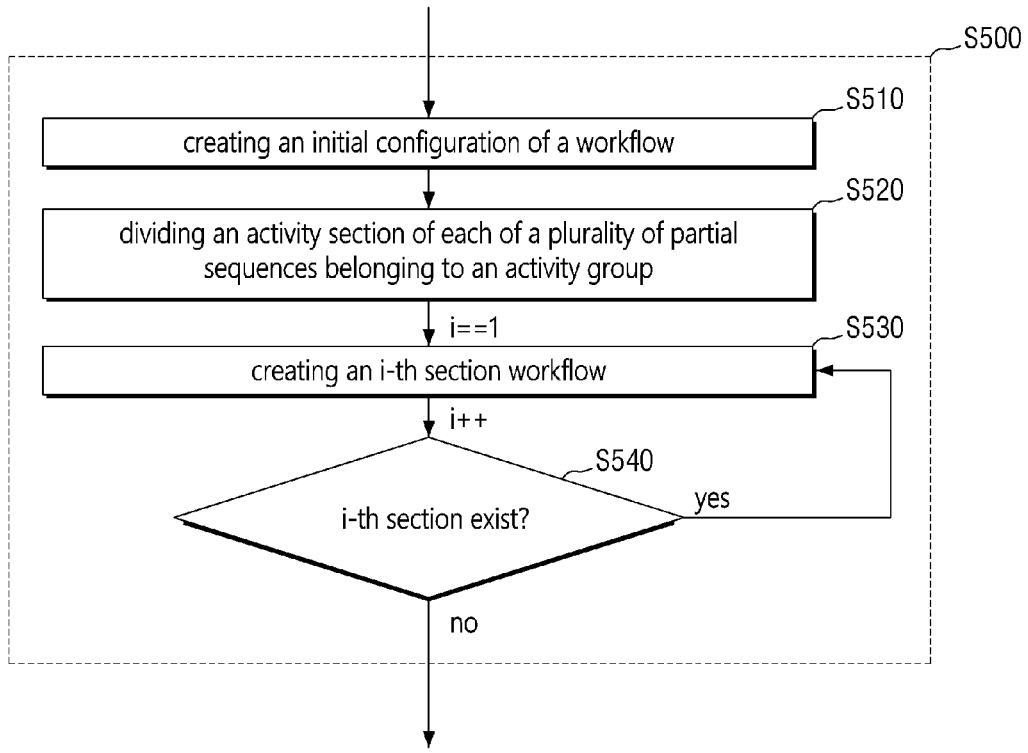
FIG. 8 is a flow chart for explaining in more detail some operations of the method for creating the workflow described with reference to FIG. 4.

Referring to FIG. 8, an initial configuration of a workflow is created in step S510. For the purpose of matching a start and end of a partial sequence, a virtual start node and end node may be created.

Next, in step S520, an activity section of each of a plurality of partial sequences belonging to an activity group is divided. In order to derive a partial sequence into a workflow at one time, the amount of computation may be greatly increased depending on a length of the partial sequence and the number of partial sequences in an activity group. Therefore, to prevent this, the activity section of each of the plurality of partial sequences in the activity group is divided.

In some embodiments, the section may be divided by a common node determined using a longest common partial sequence algorithm. For a detailed description related to this, it will be described with reference to FIGS. 22A to 22C.

Figure 22A:
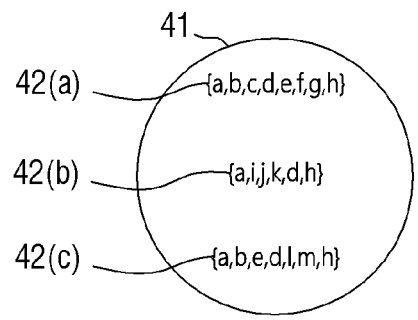
FIGS. 22A to 22C are exemplary diagrams for describing in more detail the division of an activity section of the partial sequence described with reference to FIG. 8.
Figure 22B:
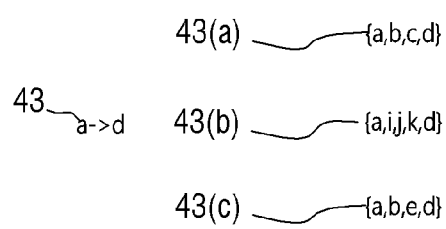
Figure 22C:
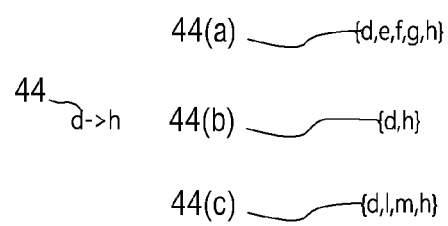

Referring to FIGS. 22A to 22C, when each of a plurality of partial sequences in the activity group 41 is {a,b,c,d,e,f, g,h} 42(a), {a,i,j,k,d,h} 42(b), and {a,b,e,d,l,m,h} 42(c), the longest common node determined by the longest common partial sequence algorithm may be {a,d,h}. Therefore, the plurality of partial sequences within the activity group may be divided into {a,b,c,d} 43(a), {a,i,j,k,d} 43(b), and {a,b, e,d} 43(c), which are a plurality of division sequences corresponding to a first section, and {d,e,f,g,h} 44(a), {d,h} 44(b), and {d,l,m,h} 44(c), which are a plurality of division sequences corresponding to a second section, respectively.

Next, in step S530, an i-th section workflow is created. If the i+1-th section exists in step S540, an i+1-th section workflow is created in step S530. If the i+1-th section does not exist in step S540, a workflow is created by extending the created plurality of section workflows to correspond to a section order.

Figure 9:
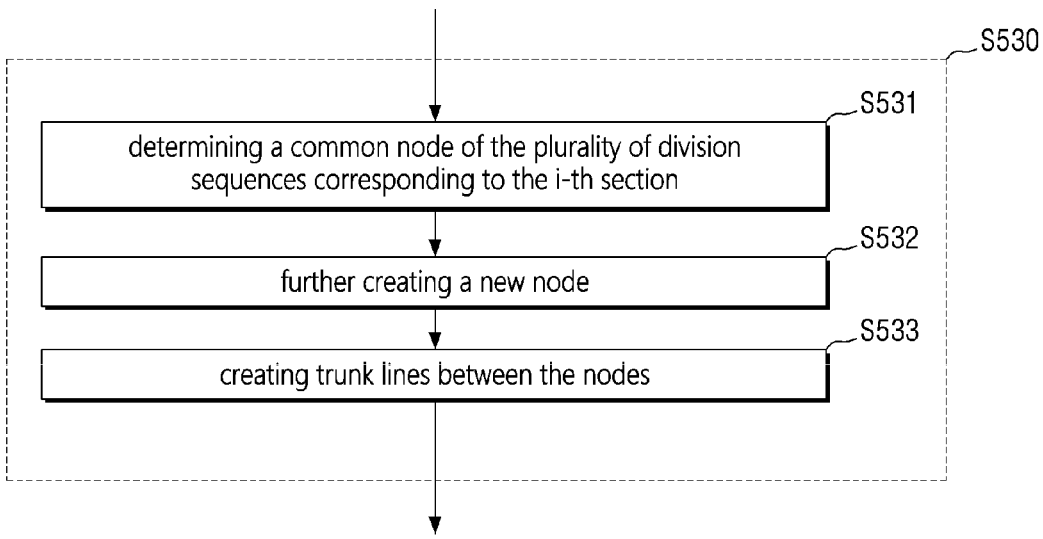
FIG. 9 is a flow chart for explaining in more detail some operations of the method for creating the workflow described with reference to FIG. 8.

In order to describe step S530 described with reference to FIG. 8 in more detail, reference will be made to FIG. 9. Referring to FIG. 9, in step S531, the longest common node of the plurality of division sequences corresponding to the i-th section is determined. Next, in step S532, a new node not included in the longest common node is additionally created. Next, in step S533, trunk lines are created between the nodes created according to the order of the division sequence used to create the i-th section workflow. For a detailed description related to this, reference will be made to FIGS. 23 to 25B.

Figures 23, 24A, 24B:
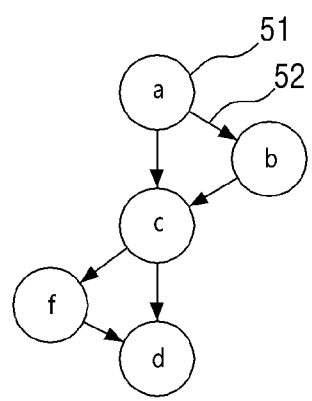
FIG. 23 is an exemplary diagram of a first division sequence to explain in more detail the creation of a section workflow described with reference to FIG. 9.
FIG. 24A is an exemplary diagram of a second division sequence to explain in more detail the creation of a section workflow described with reference to FIG. 9.
FIG. 24B is an exemplary diagram of a workflow created by the first and second division sequences of FIGS. 23 and 24A.

Referring to FIG. 23, a first division sequence 61 {a,b,c,d} is shown. All possible node paths of the first division sequence 61 are the same as a first path 61(a) to a fourth path 61(d).

Referring to FIG. 24A, a second division sequence 62 {a,c,f,d} indicating the same activity section in the same activity group as the first division sequence 61 is shown. Since the second path 61(b) and the fourth path 61(d) contain a {b} activity that is not included in the second division sequence 62, they are excluded from the determination of the longest common node. A third path 61(c), which is a possible path of the second division sequence 62 and is the longest path, is determined. Nodes {a}, {c}, and {d} included in the third path 61(c) are determined as the longest common node.

Referring to FIG. 24B, a workflow created with nodes 51 and trunk lines 52 is shown. The workflow shown in FIG. 24B is a workflow created by the first division sequence 61 and the second division sequence 62 of FIG. 24A. The longest common nodes {a}, {c}, and {d} of the first division sequence 61 and the second division sequence 62 are created. Nodes {b} and {f} not included in the longest common node are also created as shown in FIG. 24B. Next, a section workflow is created by creating trunk lines between nodes created according to an order of the first division sequence 61 and the second division sequence 62.

Figures 25A, 25B:
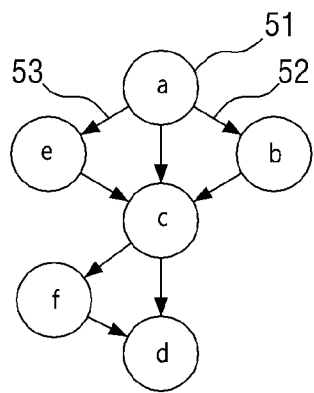
FIG. 25A is an exemplary diagram of a third division sequence to explain in more detail the creation of a section workflow described with reference to FIG. 9.
FIG. 25B is an exemplary diagram of a workflow of the third division sequence of FIG. 25A.

Referring to FIG. 25A, a third division sequence 63 {a,e,c,f,d} indicating the same activity section in the same activity group as the first partitioning sequence 61 and the second partitioning sequence 62 is shown. Referring to FIG. 25B, in accordance with the creation of a new node {e}, a section workflow is created by creating a trunk line between the new node and the existing node created in the order of the third division sequence 63. In this way, a section workflow may be created by using a plurality of division sequences indicating the same activity section within the activity group.

According to the embodiment, a section workflow consisting of nodes and trunk lines may be created. In addition, by extending the section workflow, a workflow of a repetitive task included in a task performed by a user may be created.

In the workflow created according to the embodiment, a workflow is created by integrating activities between partial sequences within an activity group as much as possible, and thus, the user may understand the workflow more intuitively. In addition, the user may clearly recognize what repetitive tasks that may be subject to RPA application through the created workflow.

Hereinafter, an exemplary computing device 1500 that can implement an apparatus and a system, according to various embodiments of the present disclosure will be described with reference to FIG. 26.

Figure 26:
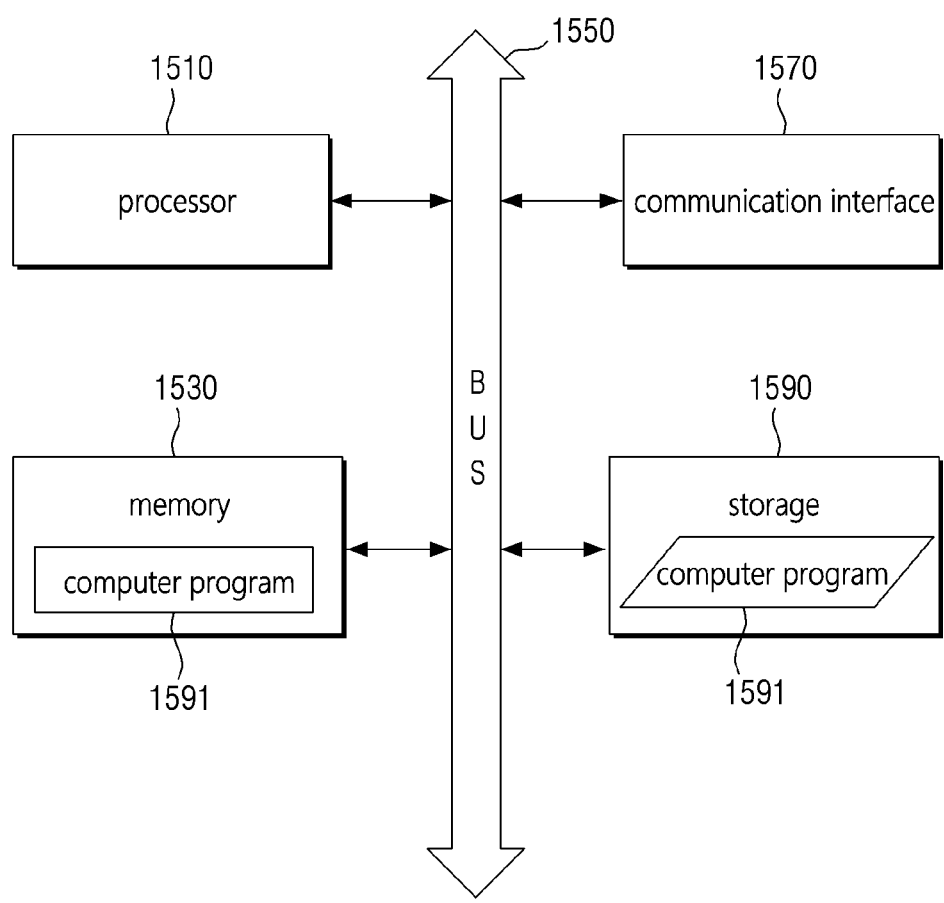
FIG. 26 is a hardware configuration diagram of an apparatus for creating a workflow according to another embodiment of the inventive concept.

FIG. 26 is an example hardware diagram illustrating a computing device 1500. As shown in FIG. 26, the computing device 1500 may include one or more processors 1510, a bus 1550, a communication interface 1570, a memory 1530, which loads a computer program 1591 executed by the processors 1510, and a storage 1590 for storing the computer program 1591. However, FIG. 26 illustrates only the components related to the embodiment of the present disclosure. Therefore, it will be appreciated by those skilled in the art that the present disclosure may further include other general purpose components in addition to the components shown in FIG. 26.

The processor 1510 controls overall operations of each component of the computing device 1500. The processor 1510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 1510 may perform calculations on at least one application or program for executing a method/ operation according to various embodiments of the present disclosure. The computing device 1500 may have one or more processors.

The memory 1530 stores various data, instructions and/or information. The memory 1530 may load one or more programs 1591 from the storage 1590 to execute methods/operations according to various embodiments of the present disclosure. For example, when the computer program 1591 is loaded into the memory 1530, the logic (or the module) as shown in FIG. 4 may be implemented in the memory 1530. An example of the memory 1530 may be a RAM, but is not limited thereto.

The bus 1550 provides communication between components of the computing device 1500. The bus 1550 may be implemented as various types of bus such as an address bus, a data bus and a control bus.

The communication interface 1570 supports wired and wireless Internet communication of the computing device 1500. The communication interface 1570 may support various communication methods other than Internet communication. To this end, the communication interface 1570 may be configured to comprise a communication module well known in the art of the present disclosure.

The storage 1590 can non-temporarily store one or more computer programs 1591. The storage 1590 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 1591 may include one or more instructions, on which the methods/operations according to various embodiments of the present disclosure are implemented. When the computer program 1591 is loaded into the memory 1530, the processor 1510 may perform the methods/operations in accordance with various embodiments of the present disclosure by executing the one or more instructions.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as Internet and installed in the other computing device, thereby being used in the other computing device.

Although the operations are shown in a specific order in the drawings, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation. The scope of protection of the present invention should be interpreted by the following claims, and all technical ideas within the scope equivalent thereto should be construed as being included in the scope of the technical idea defined by the present disclosure.

What is claimed is:

1. A method for creating a workflow, the method being performed by a computing device that includes at least one processor, the method comprising:

obtaining, by the at least one processor, a log file generated while a user performs a task;

parsing, by the at least one processor, each of a plurality of events recorded in the log file, and creating an activity sequence to correspond to an order of the plurality of events;

grouping, by the at least one processor, a plurality of partial sequences extracted from the activity sequence, and creating a plurality of activity groups to correspond to each of a plurality of different repetitive tasks included in the task, wherein the plurality of partial sequences are extracted from the activity sequence based on a degree of aggregation that is greater than or equal to a preset minimum degree of aggregation, a partial sequence includes one or more immediate transitions between two activities, which are a start activity and an end activity, and the degree of aggregation of the partial sequence is defined based on a number of times that each immediate transition, of the one or more immediate transitions included in the partial sequence, appears in the activity sequence, and a number of times that a start activity of each immediate transition appears in the activity sequence;

creating, by the at least one processor, a workflow of at least one activity group among the plurality of activity groups for generating a robotic process automation (RPA) script, upon which repetitive tasks included in the created workflow are to be automated by applying RPA; and visually providing to the user, by the at least one processor via a display, the created workflow including the repetitive tasks to be automated by applying the RPA.

2. The method of claim 1, wherein the obtaining the log file comprises obtaining in real time the log file generated while the user performs the task in real time.

3. The method of claim 1, wherein the creating the activity sequence comprises:

parsing each of the plurality of events recorded in the log file, wherein each event corresponds to data on the user's activity included in the task;

determining an activity key to correspond to each event using a result of the parsing; and creating the activity sequence by connecting the determined activity keys according to the order of the plurality of events.

4. The method of claim 3, wherein the determining the activity key to correspond to each event comprises creating a target activity key of a target event not to be duplicated with a pre-stored activity key upon the target event among the plurality of events being not a pre-stored event.

5. The method of claim 4, further comprising storing the created target activity key to correspond to the target event.

6. The method of claim 3, wherein the creating the activity sequence comprises creating the activity sequence until there are no residual events in the log file.

7. The method of claim 1, wherein the creating the plurality of activity groups comprises:

extracting the plurality of partial sequences from the activity sequence;

grouping the extracted partial sequences into the plurality of activity groups according to similarity; and filtering the plurality of activity groups.

8. The method of claim 1, wherein the extracting the plurality of partial sequences comprises:

calculating a first degree of aggregation of a first partial sequence corresponding to a minimum partial sequence length from an n-th activity of the activity sequence; and upon the calculated first degree of aggregation being less than the preset minimum degree of aggregation:

calculating a second degree of aggregation of a second partial sequence corresponding to the minimum partial sequence length from an n+1-th activity of the activity sequence, determining whether the calculated second degree of aggregation is greater than or equal to the preset minimum degree of aggregation, and repeating movement of a start activity of the activity sequence until the calculated degree of aggregation is greater than or equal to the preset minimum degree of aggregation.

9. The method of claim 8, wherein the repeating the movement of the start activity comprises stopping the extraction of the partial sequence upon a number of remaining activities calculated from the start activity being less than the minimum partial sequence length.

10. The method of claim 8, further comprising:

when the calculated first degree of aggregation is greater than or equal to the preset minimum degree of aggregation, extending the minimum partial sequence length and calculating a third degree of aggregation of a third partial sequence corresponding to the extended minimum partial sequence length from the n-th activity of the activity sequence, and determining whether the calculated third degree of aggregation is greater than or equal to the first degree of aggregation;

when the third degree of aggregation is greater than or equal to the first degree of aggregation, repeatedly extending the minimum partial sequence length and repeating the extension of the minimum partial sequence length until the degree of aggregation of the partial sequence immediately before the extension exceeds the degree of aggregation of the partial sequence immediately after the extension; and when the third degree of aggregation is less than the first degree of aggregation, extracting the first partial sequence.

11. The method of claim 10, wherein the repeating the extension of the minimum partial sequence length comprises stopping the extraction of the partial sequence when a number of remaining activities calculated from the n-th activity is less than the extended minimum partial sequence length.

12. The method of claim 10, further comprising repeating the extraction of the partial sequence with a next activity of the first partial sequence as the start activity.

13. The method of claim 7, wherein grouping the extracted plurality of partial sequences into the plurality of activity groups according to the similarity comprises creating an activity group by merging a first partial sequence and a second partial sequence by using the similarity defined from a number of common activities included in the first and second partial sequences extracted from the activity sequence and a number of transitions of the common activities upon the similarity being greater than or equal to a reference value.

14. The method of claim 7, wherein the filtering the plurality of activity groups comprises determining a start activity for each activity group and an end activity for each group by using an activity removal cost.

15. The method of claim 7, wherein the filtering the plurality of activity groups comprises removing an activity group upon a number of partial sequences included in the activity group being less than a second reference number.

16. The method of claim 1, wherein the creating the workflow of at least one activity group among the plurality of activity groups comprises:

dividing an activity section of each of a plurality of target partial sequences belonging to a target activity group;

creating a section workflow to correspond to each divided activity section; and creating a target workflow by extending a plurality of created section workflows.

17. The method of claim 16, wherein the creating the section workflow comprises:

determining a longest common node of a first division sequence and a second division sequence, which are created by dividing the activity section of each of the plurality of target partial sequences and indicate the same activity section; and creating trunk lines between nodes by using the first division sequence and the second division sequence.

18. The method of claim 17, further comprising:

creating a new node by using a third division sequence indicating the same activity section as the first division sequence and the second division sequence; and creating trunk lines between nodes using the third division sequence.

19. An apparatus to create a workflow, comprising:

a processor;

a network interface;

a memory; and a computer program loaded into the memory and executed by the processor, wherein the computer program comprises instructions for:

obtaining a log file generated while a user performs a task;

parsing each of a plurality of events recorded in the log file, and creating an activity sequence to correspond to an order of the plurality of events;

grouping a plurality of partial sequences extracted from the activity sequence, and creating a plurality of activity groups to correspond to each of a plurality of different repetitive tasks included in the task, wherein each of the plurality of partial sequences that are extracted from the activity sequence has a degree of aggregation that is greater than or equal to a preset minimum degree of aggregation, a partial sequence includes one or more immediate transitions of activities between two activities, which are a start activity and an end activity, and the degree of aggregation of the partial sequence is defined based on a number of times that each immediate transition, of the one or more immediate transitions included in the partial sequence, appears in the activity sequence, and a number of times that a start activity of each immediate transition appears in the activity sequence;

creating a workflow of at least one activity group among the plurality of activity groups for generating a robotic process automation (RPA) script, upon which repetitive tasks included in the created workflow are to be automated by applying RPA; and visually providing to the user, via a display, the created workflow including the repetitive tasks to be automated by applying the RPA.

\* \* \* \* \*